July 22, 1969   G. W. ALLEN ET AL   3,456,397
FORM RELIEVING HOLDER FOR ROTARY CUTTERS
Filed Feb. 23, 1965   6 Sheets-Sheet 1

July 22, 1969   G. W. ALLEN ET AL   3,456,397
FORM RELIEVING HOLDER FOR ROTARY CUTTERS
Filed Feb. 23, 1965   6 Sheets-Sheet 4

INVENTORS
Geoffrey William Allen
Ralph James Stoughurst
BY
ATTORNEY

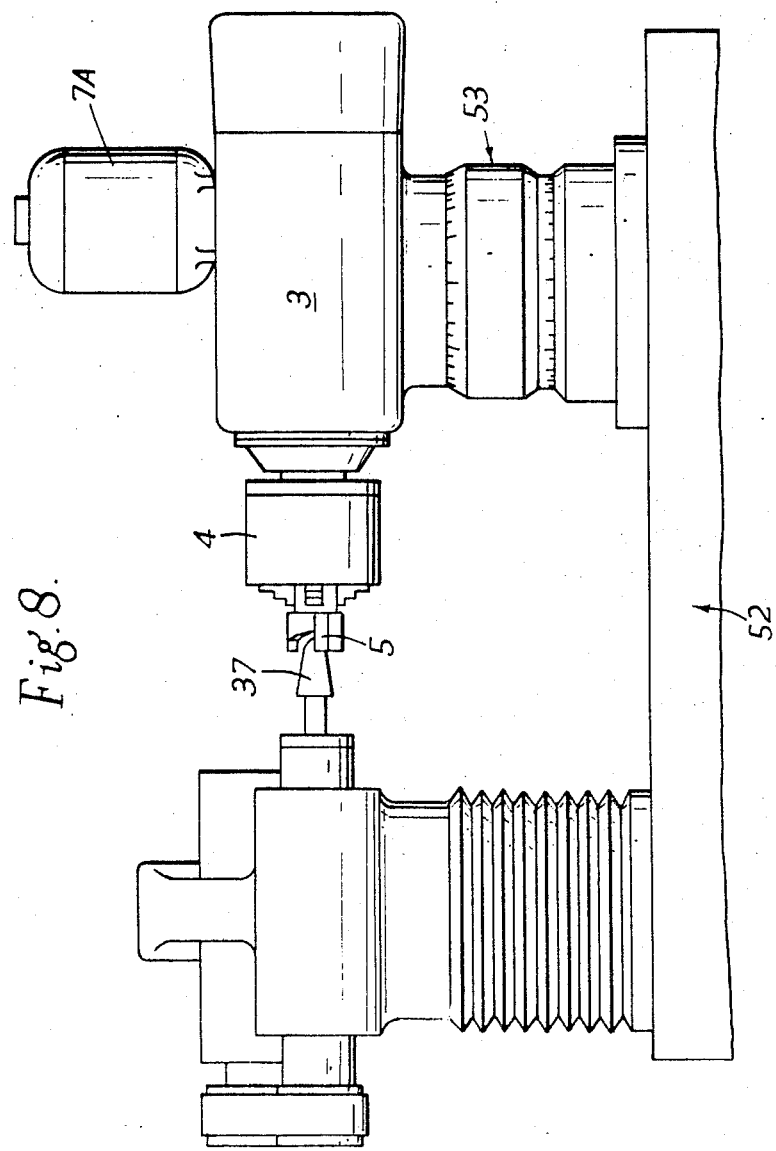

United States Patent Office 3,456,397
Patented July 22, 1969

3,456,397
FORM RELIEVING HOLDER FOR ROTARY CUTTERS
Geoffrey William Allen, Old Windsor, and Cecil James Songhurst, Hillingdon, England, assignors to The Alston Tool & Gauge Company Limited, West Drayton, England, a corporation of Great Britain
Filed Feb. 23, 1965, Ser. No. 434,215
Int. Cl. B24b *19/00, 47/02*
U.S. Cl. 51—225                                     6 Claims

ABSTRACT OF THE DISCLOSURE

A reciprocating holder normally used in relieving a workpiece in which a vertically movable member is actuated by a cam. The device includes a carriage which can be pivoted about a substantially vertical axis in alignment with the vertically moving member so that the degree of reciprocation is the same in any radial direction when the carriage is turned. The reciprocation is caused by a cam which is frusto-conical in shape so that movement of the cam will increase or decrease reciprocation.

---

Our invention relates to the relieving of small tools which are to be hand-operated or machine-operated.

Drills, taps, reamers, counter-bore cutters, counter-sink cutters, recessing tools, hobs, milling cutters, chamfer cutters, spot-face cutters and so on are examples of the kind of cutting tools with which our invention is concerned.

It is an object of this invention to provide an apparatus for form relieving a cutting tool in which the cutting tool can be angularly set at any desired angle to a relieving tool without altering the degree of relief which has been set for the tool.

It is another object of the invention to allow axial and/or radial relief to be carried out on the cutting tool simply by altering the angular setting of the cutting tool with respect to a relieving tool.

According to our invention we provide a form-relieving device comprising a movable carriage, a support for said carriage, said carriage being reciprocable on said support, a push member within said carriage arranged to reciprocate said carriage by acting on said support, a rotary cam member arranged to act on said push member, and means on said carriage for holding a cutting tool to be relieved, the direction of the resulting reciprocating movement of said carriage with said holding means and said cutting tool being adjustable by rotation of at least part of the assembly of said carriage and said support around the axis of said push member.

According to a particular feature of our invention the effect of the push member on the tool carrier is adjustable so as to vary the degree of movement of the tool carrier whereby different amounts of form relief are obtainable.

Thus, the device may have transmission means between the push member and the support for the tool carriage which are adjustable so as to vary the degree of movement of the tool carriage.

In general, the cam is rotatable through gear means which control the number of times the tool is moved into and out of grinding or shaping contact during the working of the device. The gear means may be regulated, for instance, in accordance with the number of teeth or flutes on a cutting tool which is to be relieved.

One way of transmitting the action of the push member to the tool carriage is through an oscillator and a roller which is kept in contact with the oscillator and is movable between a first limit position in which the maximum effect is transmitted to the tool carrier via the oscillator and a second limit position in which substantially no cam effect is transmitted to the tool carrier.

Alternatively, a pawl pivoted to the carriage may be used for adjusting the device between small amounts of relief. One side of the pawl may be engaged by the push member, whilst a movable control member engages the other side of the pawl.

Our preferred way of varying the cam effect is to use a tapered cam and to displace it axially on its shaft relatively to a cam follower.

Reference is now made, by way of example, to the accompanying diagrammatic drawings in which:

FIG. 8 is a highly diagrammatic side view of a grinding mechanism embodying a device according to the invention.

Figure 1:
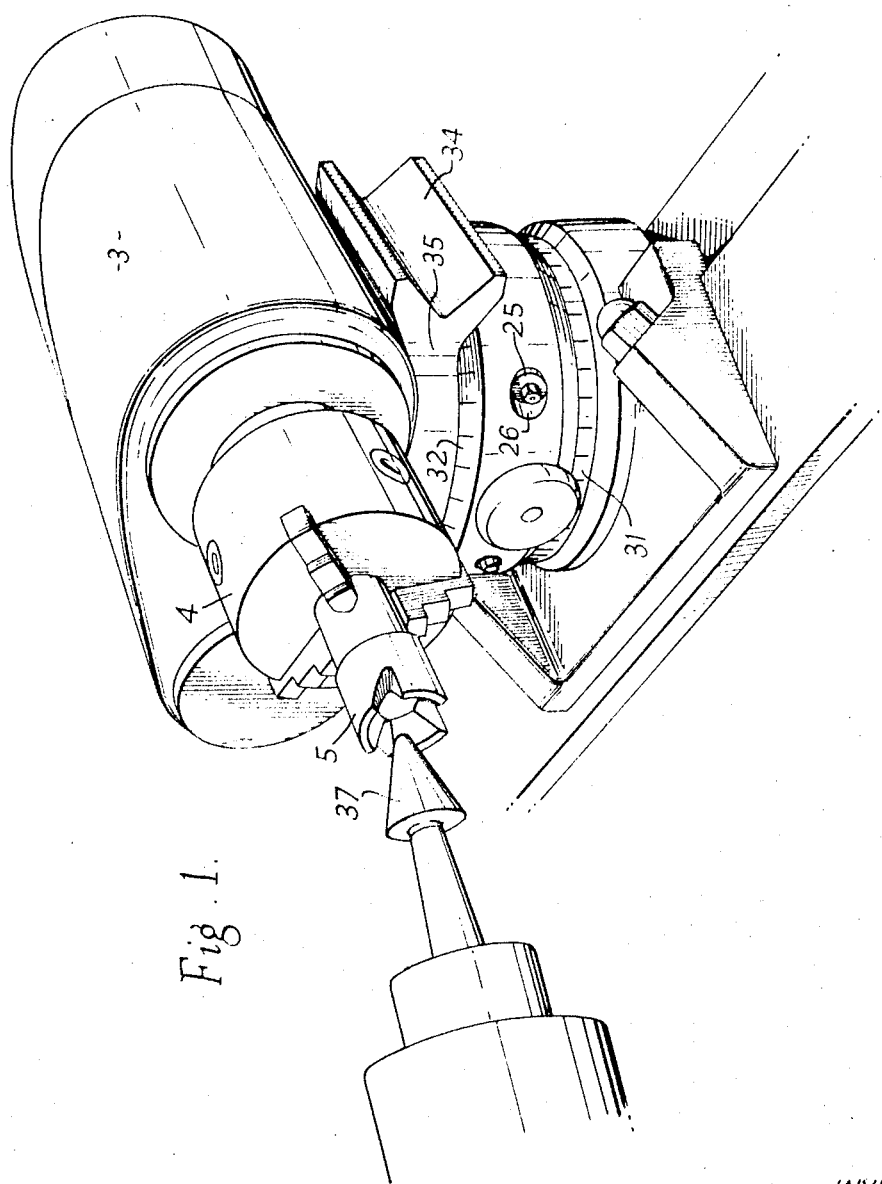
FIG. 1 is a perspective view of one form-relieving device according to our invention.
Figure 2:
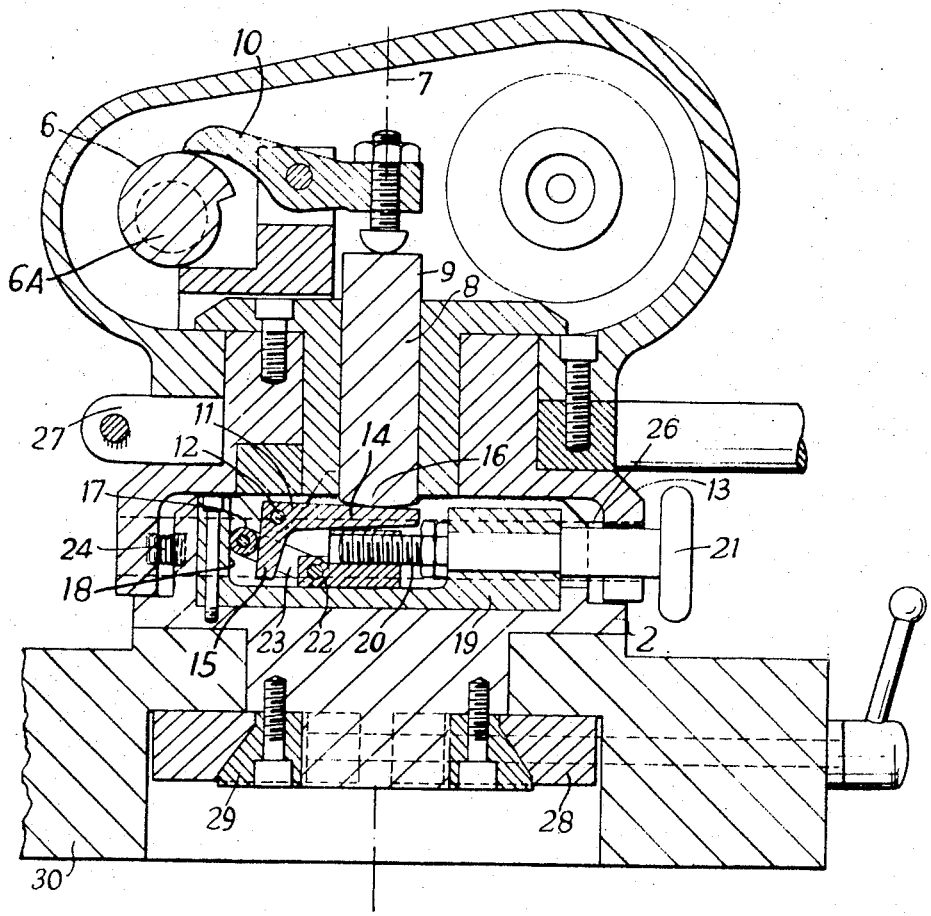
FIG. 2 is a corresponding sectional elevation.
Figure 3:
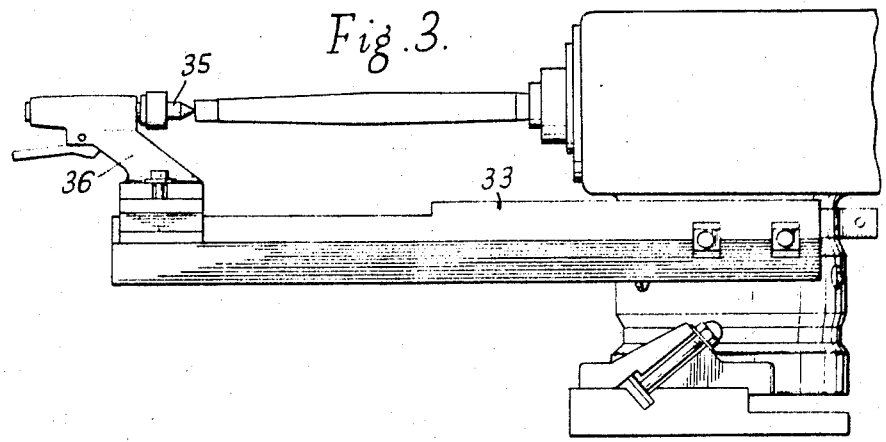
FIG. 3 is a side-view of the device of FIGS. 1 and 2 with a tail-stock.

The device shown in FIGS. 1 to 3 includes a carriage 1 which is reciprocable on a support 2. The carriage has a main housing 3 and is provided at one end with a rotary chuck 4 for holding a small tool 5 the form of which is to be relieved.

A rotary cam 6 is mounted on a camshaft 6A which is manually driven by means of a handle (not shown). The chuck 4 is rotated by the camshaft 6A through a gear train (not shown). The gear ratio can be altered, for example, to suit the number of teeth required in a cutter to be relieved. Thus, for a 4-toothed cutter, the gear ratio is set at 1:4, the cam shaft revolving 4 times for each revolution of the main shaft on which the chuck 4 is mounted.

The angular setting of the carriage 1 can be changed by rotation of the carriage around a vertical central axis 7. A vertical push rod 8, extends centrally through the carriage 1 so as to be coaxial therewith and the upper end 9 of the rod 8 engages a cam rocker 10 which follows the cam 6.

A bell-crank lever 11 is pivoted at 12 to the lower end of the carriage 1. The right-hand arm 14 of this lever is substantially horizontal and the left-hand arm 15 extends substantially vertically downwardly. The right-hand horizontal arm 14 bears against the lower end 16 of the push rod which is domed. The left-hand, vertical arm 15 bears against a vertically movable bearing roller 17 which is kept between the arm 15 and a vertical bearing surface 18 on the inside of a control housing 19 carried on the upper face of the support 2.

The control housing 19 also carries a control screw 20 which is provided with an external adjusting wheel 21 for controlling the position of the bearing roller 17.

This is done by a horizontally movable control roller 22 which runs along the base of the housing 19 and is connected to the bearing roller 17 by a pair of straps 23.

In its lower limit position, the bearing roller 17 transmits a maximum effect to the carriage 1 and causes a maximum movement. In its upper limit position there is substantially no movement of the carriage 1. A pair of compression springs 24 between the carriage 1 and the support 2 return the carriage to its starting position after each advance movement.

A pair of cylindrical steel rods 25 on the lower end of the carriage 1 extend on either side of its central axis 7 and are received in corresponding bores 26 within the support 2 so as to constitute support slides for the carriage 1.

Two simple clamp arrangements are provided. A rotatable relieving slide 27 constitutes one clamp arrangement between an internal housing 13 and the main housing 3. Another rotatable slide 28 embraces the foot 29 of the support 2. When the slides 27 and 28 are unlocked, the housing 3, the housing 3 and 13 together with the support 2 or the housing 13 and the support 2 can be rotated to provide for relieving in any desired direction.

Graduations 31 on the case 30 of the device and graduations 32 on the housing 13 allow the angular setting of the tool 5 to be accurately controlled.

The device may carry a tail-stock 33 (FIG. 3) which is constituted by a tube of square section located in a V-shaped seating 34 which is integral with the slide 27. A centre 35 is carried on a slide block 36 which is movable along the tail-stock 33. The shape of the tail-stock and of its seating ensures that this movable centre remains properly positioned on the centre line after any adjustments.

The push rod 8 is maintained in working contact with the rocker by means of a light-spring (not shown) which acts on the lower end 16 of the rod 8.

The device just described operates as follows. A tool to be ground or shaped is mounted in the chuck 4 or between the chuck 4 and the movable centre 35. The setting of the tool 5 and the direction of the relief are determined as described above using the two sets of graduations 31 and 32 and releasing either or both of the slides 27 and 28 as required.

Either or both slides are then unlocked, a grinding tool 37, for instance, is set in motion and the cam 6 is manually rotated. This causes a corresponding rotation of the main shaft, carrying the chuck 4, at a speed governed by the number of teeth required and the corresponding gear ratio which is set. At the same time, the cam 6 intermittently subjects the push rod 8 to a downward force via the rocker 10, and in this way the carriage 1 is intermittently advanced so that the tool 5 is brought into contact with the grinding tool 37. The surface of the cam 6 falls back sharply beyond the cam peak so that, at the end of each desired grinding step, e.g. on a particular tooth or flute, the tool 5 is sharply withdrawn from grinding contact with the tool 37 by a corresponding movement of the carriage 1 as a whole under the effect of the return springs 24 between the carriage 1 and its support 2.

When the amount of form relief to be given to the teeth or flutes, for example, is to be altered, the control screw 20 is actuated by the wheel 21 so as to alter the position of the bearing roller 17.

The device described with reference to FIGS. 1 to 3 is both simple and effective. In summary, it has the following main distinctive features. The central location of the push rod 8 allows the angular setting of the carriage and housing to be altered without the cam action being affected. Changes of position of the bearing roller 17 for different amounts of relief are easily effected by the screw 20 and these adjustments are made without any dismantling of the apparatus such as the replacement of the cam 6 by another cam. Furthermore, the adjusting means provide fine adjustment which is often of considerable value. The slide mounting of the carriage 1 on its support 2 is also simple and easy to dismantle. Finally, the design of the tail-stock 33 has the advantage that the movable centre is positioned on the centre line whenever the tail-stock 33 is returned to its seating 34.

Figure 4:
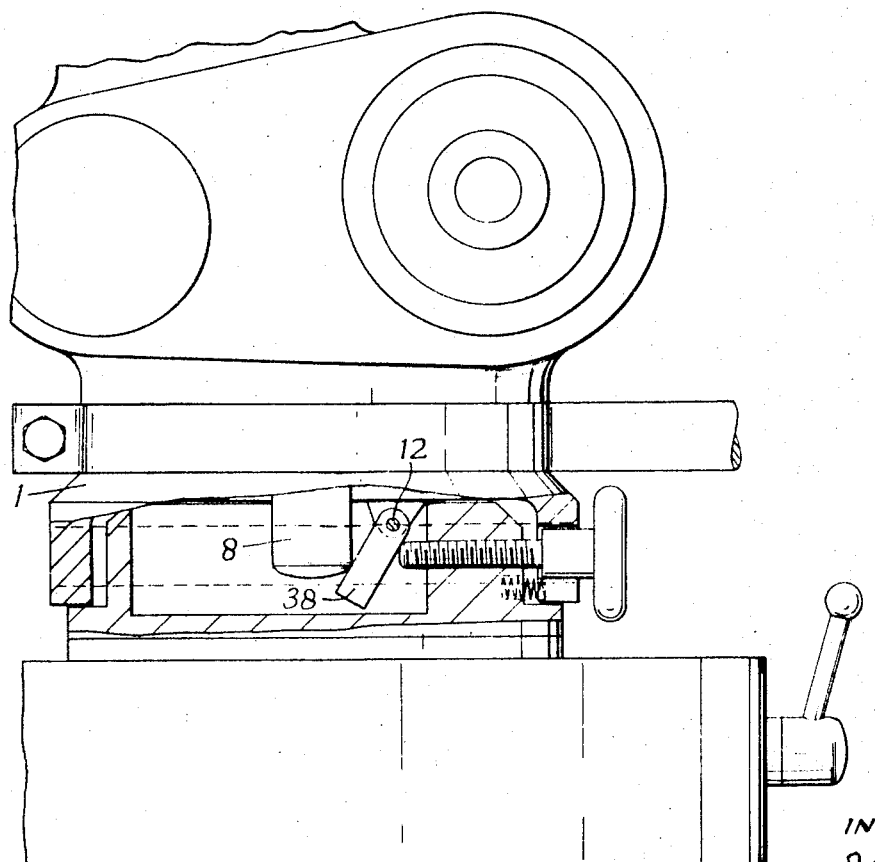
FIG. 4 is a side-view, partly in section of a modification of the device of FIGS. 1 to 3.

Alternative adjusting means of various kinds may be employed. Thus, for instance, when only relatively small amounts of relief are required, the construction of FIGURE 4 may be employed. In this construction, the push rod 8 is made to act upon one side of a pawl 38, which is pivoted at 12 to the foot of the carriage 1. The adjusting screw 20 acts upon the other side of the pawl 38, so as to limit the movement of the carriage under the effect of the side forces exerted on the pawl.

Figure 5:
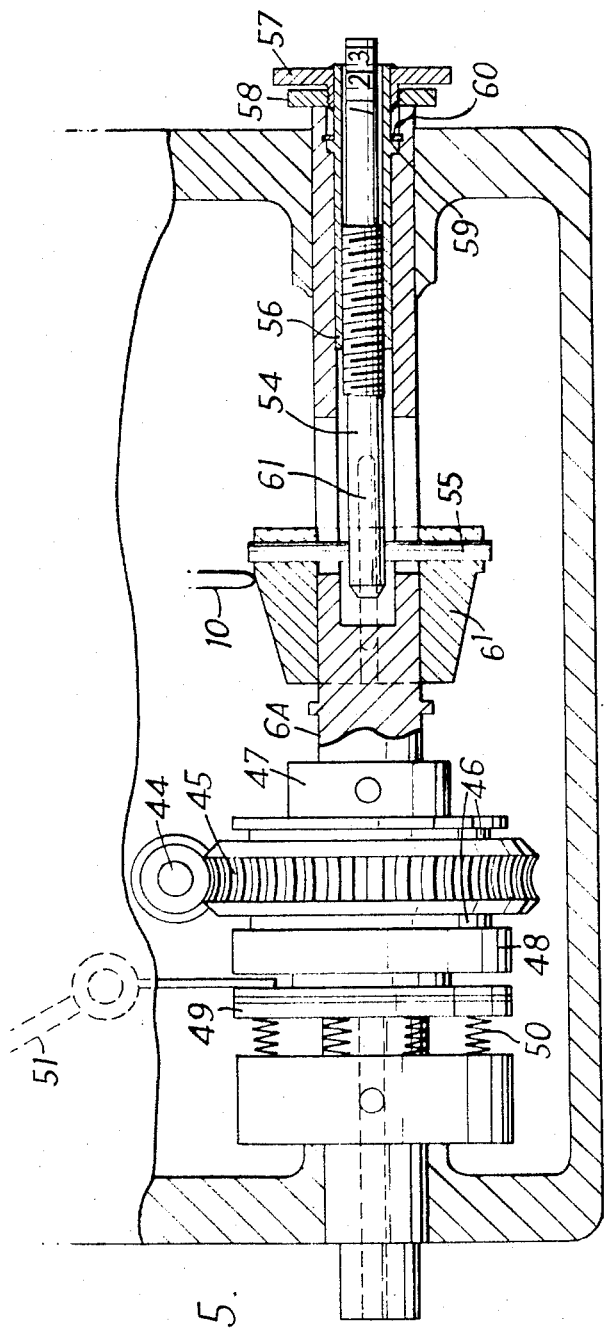
FIG. 5 is a plan view, mainly in section, of one part of a modification of the device of FIGS. 1 to 3 or FIG. 4.
Figure 6:
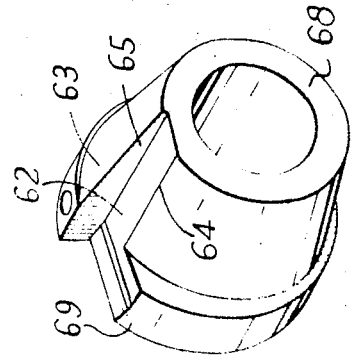
FIG. 6 is a perspective view of a detail in FIG. 5.
Figure 7:
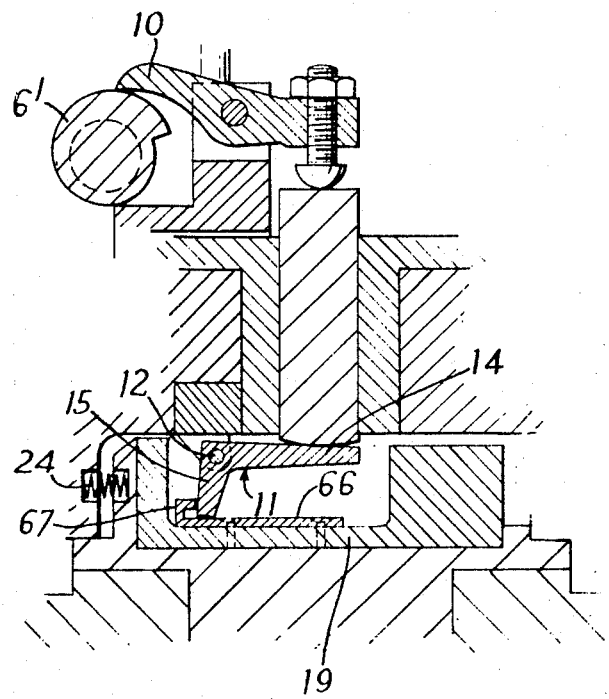
FIG. 7 is an axial section of another part of the modified device of FIG. 5.

In the modified device of FIGS. 5 to 7, a tapered rotary cam 6' is driven by a variable speed motor 7A (FIG. 8) instead of being manually driven:

FIGURE 5 shows the worm-shaft 44 of the motor 7A. The shaft 44 meshes with a worm wheel 45 which is freely mounted on the cam shaft 6A. The shaft 6A carries a plate clutch which is constituted by cork plates 46 mounted between a fixed collar 47 and a movable collar 48.

The clutch is biased to its operative condition by a Timkin thrust bearing 49 urged to the right-hand side, as viewed in FIG. 5, by compression springs 50. The clutch can me made inoperative by means of a clutch lever 51 acting against this spring biasing.

The use of the modified cam 6', which is keyed to the camshaft 6A at 61, allows the effect produced by the cam to be adjusted simply by adjusting the position of the cam 6' on its shaft 6A. The cam adjustment is made as follows.

A rod 54 with an externally threaded middle portion 54A is connected to the cam 6' by dowel pins 55, and is received within an internally threaded sleeve 56. The right-hand end of the sleeve 56 is provided with an adjusting nut 57, fixed to the sleeve, and with a lock-nut 58.

A shoulder 59 on the sleeve 56 prevents inward movement of the sleeve and a circlip 60 prevents the outward movement of the sleeve. Accordingly, clockwise rotation of the adjusting nut 57 causes axial movement of the cam 6' to the left, and anti-clockwise rotation of the nut 57 causes movement of the cam 6' to the right.

The cam 6' approximates in shape to a cone frustum with a central cylindrical bore. The surface of the cam 6' may be visualised as consisting of a multitude of spiral lines all starting at the same level on line 64 and ending at different levels on line 65, which is inclined upwardly from the front 68 to the back 69 of the cam.

The leftward movement of the cam 6', as seen in FIG. 5, finally brings the rocker 10 to the spiral line which ends at the highest level on the line 65 (see FIG. 5), giving the greatest drop to the flat 62 from the peak 63 of the cam. The rightward movement of the cam 6' brings the rocker 10 to the spiral line which ends at the lowest level on the line 65, giving the smallest drop.

The right-hand end of the rod 54 is calibrated as shown to correspond to different positions of the cam 6' on its shaft 6A, and to correspondingly different amounts of cam relief.

When the cam 6' is used to provide the required adjustment of the cam effect, the adjusting wheel 21, the bearing roller 17 and the control roller 22 are omitted as shown in FIGURE 8. A strip 66, fixed to the base of the housing 19 has an upstanding flange 67 at its left-hand end which provides a bearing surface for the left-hand arm 15 of the bell-crank lever 11.

The modified construction of FIGS. 5 to 7 has the advantage of simplicity and greater ease of operation. Furthermore, when only small effects are needed, the device no longer has to accommodate a constant large drop from the peak of the cam. In this way, undersirable vibrations are minimised, in operation.

We have described in detail above a device which forms a separate unit and may be mounted on most, if not all, conventional grinding machines, lathes or like machines. We have however, also developed a grinding machine shown generally at 52 in FIGURE 8 which has a workhead 53 in accordance with the device of the invention built into it.

Figure 9:
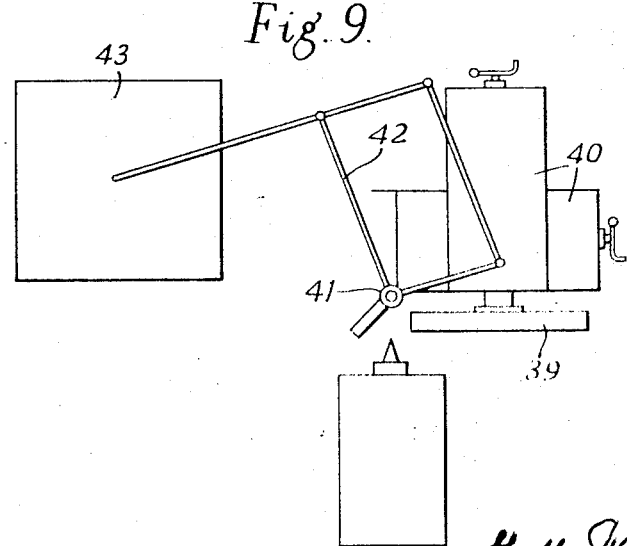
FIG. 9 is a diagram showing optical supervision of a grinder used with a device according to the invention.

The grinding wheel column of the machine may also be mounted on a pair of slides similarly to our device or, according to a preferred feature of our invention, be optically supervised and/or provided with a pantograph giving a 50:1 reduction of the required grinding form. As shown in FIG. 9, a grinding wheel 39 is mounted on two hand-operated swivel slides 40 which are at right angles to one another. An optical unit 41 is fitted to a pantograph 42 which moves at $\frac{1}{50}$ of the drawing size.

The pantograph 42 is associated with a drawing board 43 on which 50:1 scale drawings are used.

It will also be appreciated, that, although the device of our invention has been described in detail only with reference to form-relieving achieved by means of a grinding wheel, it is equally applicable to form-relieving achieved by means of a shaping tool, for instance, on a form-relieving lathe.

We claim:

1. A form relieving device comprising a movable carriage, a fixable support for said carriage, said carriage being reciprocal on said support from a normal to a biased position, a vertically movable push member within said carriage arranged to reciprocate said carriage by urging said carriage in a substantially non-vertical direction through transmission means, spring means for returning said carriage to its normal position, holding means on said carriage for holding a workpiece to be relieved, a rotary cam operatively associated with said push member to periodically actuate said push member whereby said carriage and said workpiece are reciprocated relative to a relieving tool, at least part of said device, including a carriage, being rotatable about a substantially vertical axis which is in substantial alignment with the movements of said push member whereby the actuation of said is equally effective in any radial direction, said transmission means being positioned between said push member and said support and adjustable to vary the extent of reciprocation of said carriage and workpiece, and said adjustable transmission means being a pivoted bell-crank pawl, one leg of said pawl being in contact with said push member, a roller member held between said support and the other leg of said pawl member, the pivot for said pawl member being located at the junction of the two legs constituting said pawl member and the effect of said push member being varied by adjustment of the distance between said roller member and said pivot.

2. A form relieving device comprising a movable carriage, a fixable support for said carriage, said carriage being reciprocal on said support from a normal to a biased position, a vertically movable push member within said carriage arranged to reciprocate said carriage by urging said carriage in a substantially non-vertical direction through transmission means, spring means for returning said carriage to its normal position, holding means on said carriage for holding a workpiece to be relieved, a rotary cam operatively associated with said push member to periodically actuate said push member whereby said carriage and said workpiece are reciprocated relative to a relieving tool, at least part of said device, including said carriage, being rotatable about a substantially vertical axis which is in substantial alignment with the movements of said push member whereby the actuation of said cam is equally effective in any radial direction, a pivotable rocker connected to said carriage, said rotary cam rockably associated with one end of said rocker and the other end of said rocker bearing on said push member to urge said member downwardly during operation.

3. A device according to claim 2, wherein said rotary cam is tapered to vary the distance said push member is urged by said rocker and consequently the amount of reciprocation of said carriage.

4. A device according to claim 3, wherein said rocker is a cam follower with a pointed end which bears on said tapered rotary cam, the opposite end of said follower bearing on said push member.

5. A device according to claim 3, wherein said cam is generally frusto-conical in shape with an outside surface extending from a trough line parallel with the axis of said cam to a peak line inclined to the latter axis.

6. A device according to claim 3, wherein said cam is mounted on a shaft, said cam being slideable along said shaft whereby the amount of reciprocation of said carriage is varied.

References Cited

UNITED STATES PATENTS

| 2,752,740 | 7/1956 | Mouw | 51—232 |
| 2,784,538 | 3/1957 | Clark | 51—43 X |

HAROLD D. WHITEHEAD Primary Examiner

U.S. Cl. X.R.

51—232